(12) United States Patent
Hedman

(10) Patent No.: US 7,412,908 B2
(45) Date of Patent: Aug. 19, 2008

(54) METHOD AND ARRANGEMENT FOR COUNTERACTING INAPPROPRIATE MANUAL GEARSHIFTS IN PREDETERMINED VEHICLE CONDITIONS

(75) Inventor: Anders Hedman, Marstrand (SE)

(73) Assignee: Volvo Lastvagnar AB, Gothenburg (SE)

( * ) Notice: Subject to any disclaimer, the term of this patent is extended or adjusted under 35 U.S.C. 154(b) by 335 days.

(21) Appl. No.: 11/421,687

(22) Filed: Jun. 1, 2006

(65) Prior Publication Data
US 2006/0236799 A1 Oct. 26, 2006

Related U.S. Application Data

(63) Continuation of application No. PCT/SE2005/000073, filed on Jan. 21, 2005.

(30) Foreign Application Priority Data
Jan. 30, 2004 (SE) .................................. 0400192

(51) Int. Cl.
*F16H 59/00* (2006.01)
(52) U.S. Cl. ........................................................ 74/335
(58) Field of Classification Search .................. 74/335, 74/339, 473.12, 473.1
See application file for complete search history.

(56) References Cited

U.S. PATENT DOCUMENTS

| | | | |
|---|---|---|---|
| 3,682,014 A | 8/1972 | Magg et al. | |
| 6,102,829 A * | 8/2000 | Muddell et al. | ............... 477/77 |
| 6,361,473 B1 * | 3/2002 | Mason et al. | ............... 477/124 |
| 6,422,363 B1 | 7/2002 | Olsson et al. | |
| 6,898,992 B2 * | 5/2005 | Koenig et al. | ................. 74/335 |
| 7,367,244 B2 * | 5/2008 | Shimamura et al. | ........... 74/335 |

FOREIGN PATENT DOCUMENTS

| | | |
|---|---|---|
| DE | 1002957 B | 2/1957 |
| DE | 2655263 B1 | 6/1978 |

OTHER PUBLICATIONS

International Search Report from corresponding International Application PCT/SE2005/000073.

* cited by examiner

*Primary Examiner*—Dirk Wright
(74) *Attorney, Agent, or Firm*—WRB-IP LLP

(57) ABSTRACT

The invention relates to a method and an arrangement for counteracting inappropriate manual gearshifts in predetermined vehicle conditions by way of a gearshift control in a stage-geared transmission, arranged in a motor vehicle and having a shift servo for intensifying the shifting force applied to the gearshift control. In the case of a pneumatic or hydraulic shift servo the control unit is designed to interrupt the energy supply to the shift servo by closing a valve. The shifting force applied to the gearshift control can be measured, the level of the output force from the shift servo being determined as a function of the measured shifting force applied.

16 Claims, 4 Drawing Sheets

METHOD AND ARRANGEMENT FOR COUNTERACTING INAPPROPRIATE MANUAL GEARSHIFTS IN PREDETERMINED VEHICLE CONDITIONS

BACKGROUND AND SUMMARY

The present application is a continuation of International Application No. PCT/SE2005/000073, filed Jan. 21, 2005, which claims priority to SE 0400192-1, filed Jan. 30, 2004. The present invention relates to a method for counteracting inappropriate manual gearshifts in predetermined vehicle conditions by way of a gearshift control in a stage-geared transmission, arranged in a motor vehicle and having a shift servo for intensifying the shifting force applied to the gearshift control.

The present invention also relates to a motor vehicle stage-geared transmission, the input shaft of which is coupled to an engine arranged in the vehicle for propelling the vehicle by way of a clutch for isolating the engine from the transmission. The transmission comprises a gearshift control for manual gear selection, a sensor arrangement for detecting the shifting force applied to the gearshift control, a shift servo controlled by the sensor arrangement for amplifying the shifting force, and a clutch control for controlling the clutch.

The present invention also relates to a computer program for performing such a method with the aid of a computer.

In manually shifted vehicle transmissions it is in principle possible to engage any of the available gears. When the vehicle is underway, however, certain gears may be considered inappropriate under the prevailing operating conditions. One simple example is the engagement of a high gear with a low ratio when the vehicle is moving at slow speed. This can result in the rotational speed of the engine falling to such a level that the engine is incapable of driving the vehicle without stalling.

Under other conditions the engagement of inappropriate gears may be damaging and dangerous. A typical example is the engagement of a low gear with a high ratio when the vehicle is traveling at high speed. Such engagement can result in a very high rotational speed of the transmission input shaft. The parts of the clutch rotationally locked to this shaft may then break under the effect of centrifugal force. Moreover, if the geared coupling arrangement, which is used in engaging the gear in question, is provided with a synchromesh arrangement of known type, this is exposed to a very high stress when the input shaft is accelerated to said very high rotational speed.

However, a separate arrangement for preventing the engagement of inappropriate gears is generally not provided on simpler types of manual transmissions, like those used in smaller vehicles such as passenger cars and smaller trucks. Such an arrangement has not proved necessary. When trying to engage a low gear at high vehicle speeds, for example, the time for synchronization, that is to say acceleration of the input shaft, is so long that the driver generally manages to perceive that it is inappropriate and can discontinue the gearshift.

In heavy road vehicles, such as trucks, for example, the transmission often comprises a basic transmission having multiple possible ratios, and an auxiliary transmission, so-called range transmission. The latter has a low gear with high ratio and a high gear with no ratio, so-called direct gear. One typical such transmission is described in SE521149.

The range transmission in principle doubles the number of gears in the basic transmission. The lowest gears, with the highest ratio, are achieved by combining the gears in the basic transmission with the low gear in the range transmission. These gears are called low-range gears. In the highest gears with low ratios, on the other hand, the high gear of the range transmission is used. The term high-range gears is accordingly used for these gears. Shifting up from one of the higher low-range gears to one of the lower high-range gears frequently occurs when driving. Such shifts require shifting of both the basic transmission and the range transmission. The basic transmission must be shifted from one of its higher gears to one of its lower gears, whilst the range transmission must be shifted from the low gear to the high gear. If the shifting of the range transmission should not occur for any reason, the result would be that only the basic transmission would be shifted down to one of its lower gears. This would result in a very high rotational speed on the input shaft. The risks of this have been described above.

A usual requirement for shifting the range transmission is that the basic transmission should be in neutral position. This is because the synchromesh arrangements in the geared coupling arrangement of the range transmission would otherwise be overloaded or would have to have absurdly large dimensions. Shifting of the range transmission must therefore not be commenced before the basic transmission has come into the neutral position, and the engagement of a gear in the basic transmission must be prevented until the shifting of the range transmission has been completed.

Vehicle transmissions which comprise a basic transmission and a range transmission are therefore usually provided with a mis-shift counteracting arrangement. This prevents the engagement of a number of the gears in the basic transmission when, according to predefined rules, this is inappropriate under the prevailing operating conditions. The mis-shift counteracting arrangement can be designed in various ways.

The driver usually preselects a shifting of the range transmission, for example, by moving a rocker switch lever which is located, for example, on the gearshift control knob (usually a gearshift lever). This provides a compact gearshift pattern, a so-called overlaid H-pattern. An example of this for a transmission having four forward gears in the basic transmission is shown in FIG. 1. The overlaid H-pattern is here denoted by 101. In FIG. 1, R denotes reverse gear, LR low-range gears and HR high-range gears.

The actual shifting of the range transmission is performed after preselecting as soon as the basic transmission has been moved into neutral position. During the shifting of the range transmission an arrangement prevents engagement of the basic transmission gears. Examples of such arrangements are shown in SE513390 and DE10029527. In both cases a pneumatic cylinder is used in which the air supply is controlled by valves. When actuated, this cylinder is capable of pressing a peg-like component into an opposing groove or pit-shaped cavity in one of the components of the basic transmission gearshift control, which transmits force and movement from the gearshift control to the geared coupling arrangements of the basic transmission when shifting gear. The engagement of one or more gears in the basic transmission is thereby counteracted, depending on the shape of the peg-like component and the opposing cavity. Normally such a mis-shift counteracting arrangement is designed so that engagement of the gears in the basic transmission which would be inappropriate in that instance is not entirely blocked, but requires distinctly greater force than normal on the gearshift control.

One disadvantage of the mis-shift counteracting arrangements according to and is that the pneumatic cylinder with associated parts increases the manufacturing cost of the transmission.

DE2655263 shows another method of counteracting the engagement of gears in the basic transmission whilst shifting of the range transmission is in progress. The shift pattern is then enlarged so that the low-range gears and the high-range gears have separate positions. This is referred to as a double H-pattern and is represented schematically in FIG. 2 for a transmission having four gears in the basic transmission. In FIG. 2 the double H-pattern is denoted by 201. Shifting of the range transmission here commences when the gearshift control passes the neutral position 202 between the positions for the low-range gears LR and the high-range gears HR. If the shifting of the range transmission is done swiftly enough, it is completed before there has been time to begin any gear change in the basic transmission. The gearshift pattern itself thereby becomes a mis-shift counteracting arrangement in its own right. Furthermore, no separate control is required on the gearshift control for pre-selecting the range transmission shift. This makes it possible to keep the costs down.

A comparison with the overlaid H-pattern in FIG. 1 reveals that the double H-pattern in FIG. 2 requires considerably more lateral space for the gearshift control. This can lead to serious space problems in the driver's cab with the risk of the gearshift control catching on the driver's seat or the instrument panel. An even greater disadvantage is that the positions for certain gears end up a long way from the driver. When these gears are to be engaged, this results in a non-ergonomic working position for the driver. The result is low possible shifting forces and a risk of damage due to wear. There has therefore been a decline in the use of a double H-pattern for shifting of the basic transmission and the range transmission.

A method and an arrangement for gear shifting with overlaid H-pattern according to FIG. 1 but without any separate control on the gearshift control for pre-selection of range transmission shifting is described in DE10152960. An electronic control arrangement decides, according to predetermined rules based on the rotational speed of the engine, the vehicle speed and the movement which the driver imparts to the gearshift control, whether or not the range transmission is to be shifted. This arrangement here functions as a type of mis-shift counteracting arrangement. A major disadvantage with this system is that in practice it has proved difficult to always determine clearly which gear in the range transmission the driver wishes to engage. For certain combinations of vehicle, engine and transmission it can be difficult, given certain combinations of engine speed, vehicle speed and gearshift control movement, to decide whether the driver wishes to shift to low-range gears or to high-range gears.

One conclusion is that the overlaid H-pattern with separate control on the gearshift control for pre-selection of the range transmission shift is often to be preferred from the technical and functional standpoint. This system is also commonly encountered. However, the embodiments hitherto demonstrated have required a separate mis-shift counteracting arrangement, which has a disadvantage in terms of cost.

The use of so-called shift servos has recently increased, especially for transmissions in heavy road vehicles. A shift servo intensifies the force with which the driver, via a gearshift control, acts upon the geared coupling arrangements for the engagement and disengagement of gears in the transmission. The principle behind this is shown schematically in FIG. 3. The driver shifts a transmission 301 by means of a gearshift control 302. A connecting arrangement 303 transmits force and movement from the gearshift control to a control arrangement 304 on the transmission 301. The control arrangement 304 transmits the shifting force and the shifting movement to the geared coupling arrangement in the transmission 301, which engages the gear corresponding to the position in the gearshift pattern according to FIGS. 1 and 2, for example. The moving parts of the control arrangement 304 are also connected to a shift servo 305. By way of an energy supply element 306, the shift servo 305 receives energy, in the form of electricity, compressed air or hydraulic oil, for example, from an energy reserve (not shown). A measurement of the shifting force applied by the driver is obtained from a sensor arrangement 307 and is transmitted to the shift servo 305 by a signal relay 308. The sensor arrangement 307 may be integrated into the shift servo 305, in which case the signal relay 308 is omitted. The shift servo 305 imparts additional force for the gearshift depending on the shifting force applied by the driver. The additional force is usually proportional to the shifting force applied by the driver, up to an upper limit, which safeguards the control arrangement 304 and the geared coupling arrangements in the transmission 301.

EP1167836 shows an electronically controlled electrical actuator which intensifies the shifting force applied by the driver. DE19839855 describes pneumatic shift servos in which force-sensing valves regulate the pneumatic pressure of pistons, which deliver additional shifting force.

A shift servo makes the work of shifting gears easier for the driver. The shifting forces which the driver needs to exert on the gearshift control are significantly reduced due to the additional force of the shift servo. Any synchromesh arrangements in the geared coupling arrangements of the transmission can also be produced with a simple, cost-effective design. There is no need to resort to costly synchromesh arrangements like those in and EP0713024, for example. One disadvantage, on the other hand, is that the low forces on the gearshift control in conjunction with the large overall shifting forces make it more difficult for the driver to discover in good time any inappropriate gearshift of the type described earlier. A mis-shift counteracting arrangement becomes necessary.

Another disadvantage, which is relevant in trucks, for example, is the risk of the driver accidentally knocking against the gearshift control, for example when moving between the driver's seat and the sleeping space in the driver's cab. If, in so doing, a gear is engaged, the vehicle can be set in motion, which can constitute a safety risk. In the mis-shift counteracting arrangement in SE513390 this problem is solved in that the engagement of gears is counteracted unless the clutch pedal is depressed.

There is consequently a need, in transmissions having a shift servo and large gear ratio differences between high and low gears, for an alternative and less expensive method and arrangement for counteracting mis-shifting.

It is desirable is to provide a method and an arrangement which are cost-effective in achieving the mis-shifting counteraction function.

According to an aspect of the present invention, a method is provided for counteracting inappropriate manual gearshifts in predetermined vehicle conditions by way of a gearshift control, in a stage-geared transmission arranged in a motor vehicle and having a shift servo for intensifying the shifting force applied to the gearshift control. According to the method, an intention to shift to an inappropriate gear is registered through the gearshift control and at least the shifting force supplied by the shift servo is reduced in order to counteract engagement of the inappropriate gear.

According to another aspect of the invention, a stage-geared transmission for a motor vehicle is provided, an input shaft of which transmission is coupled to an engine arranged in the vehicle for propelling the vehicle by way of a clutch for isolating the engine from the transmission. The transmission comprises a gearshift control for manual gear selection, a sensor arrangement for detecting a shifting force applied to the gearshift control, a shift servo controlled by the sensor arrangement for amplifying the shifting force, a clutch control for controlling the clutch, and a control unit arranged to receive information on at least two of positions of the gearshift control, speed of vehicle, and position of the clutch control, the control unit being preprogrammed with information on inappropriate manual gear selection in various vehicle conditions, the control unit being designed to control the shift servo to at least reduce the shifting force of the shift servo and thereby counteract engagement of inappropriate gears.

One advantage available through certain aspects of the present invention is that gearshifts inappropriate for certain vehicle conditions can be prevented. Reducing the shifting force supplied by the shift servo means that the driver will experience an increased sluggishness in the gearshift control. In this way the driver can be made aware that the current gearshift is not a good choice of gear and damage as described above can be avoided.

According to one embodiment of the invention the shifting force supplied by the shift servo is reduced by interrupting the energy supply to the shift servo. One advantage of this is that the function is relatively easy to accomplish. From information supplied on the vehicle condition and preprogrammed information on inappropriate gearshifts in various vehicle conditions, a control unit can very easily interrupt the energy supply to the shift servo.

According to a further embodiment of the invention the control unit receives information on the applied shifting force from said sensor arrangement for detecting the shifting force applied to the gearshift control. This gives the control unit the facility for setting the shift servo to the same level of force as the measured shifting force applied, but in the opposite direction. In this way the driver experiences a transverse stop when he/she attempts to engage an inappropriate gear. Force levels other than said force level can obviously also be set. claims.

BRIEF DESCRIPTION OF THE DRAWINGS

In the following, the invention will be described with reference to preferred embodiments and the attached drawings, in which.

DETAILED DESCRIPTION

A simple way of obtaining a mis-shift counteracting arrangement on a manual transmission, which is provided with a shift servo, is to substantially reduce, in accordance with predefined rules, the additional shifting force supplied by the shift servo for inappropriate gearshifts. For electronically controlled shift servos this is relatively easy to achieve without additional components-The additional force which the shift servo delivers can then be set to a low level, or alternatively to a negative level, which means that the shift servo imparts an action opposed to the shifting force applied by the driver. Exemplary embodiments of this will be seen from FIGS. 5 and 6.

Figure 1:
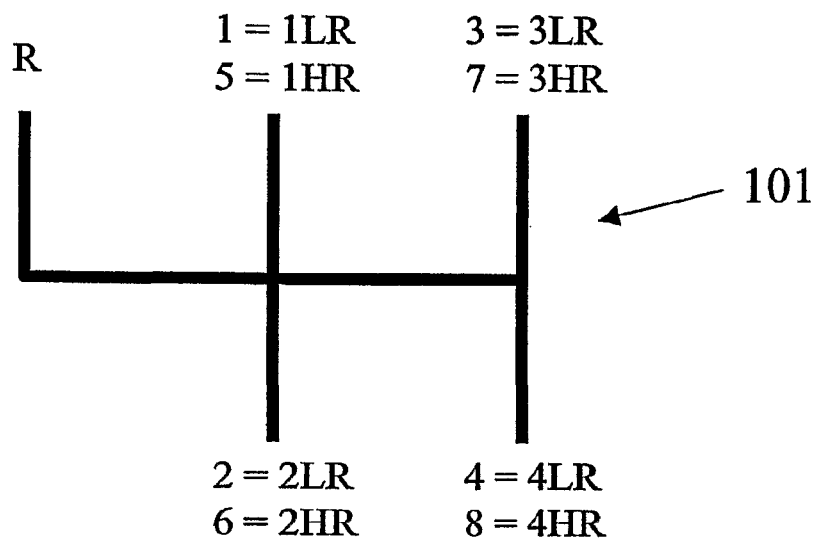
FIG. 1 shows a schematic representation of a gearshift pattern in the form of an overlaid H-pattern according to the prior art.
Figure 2:
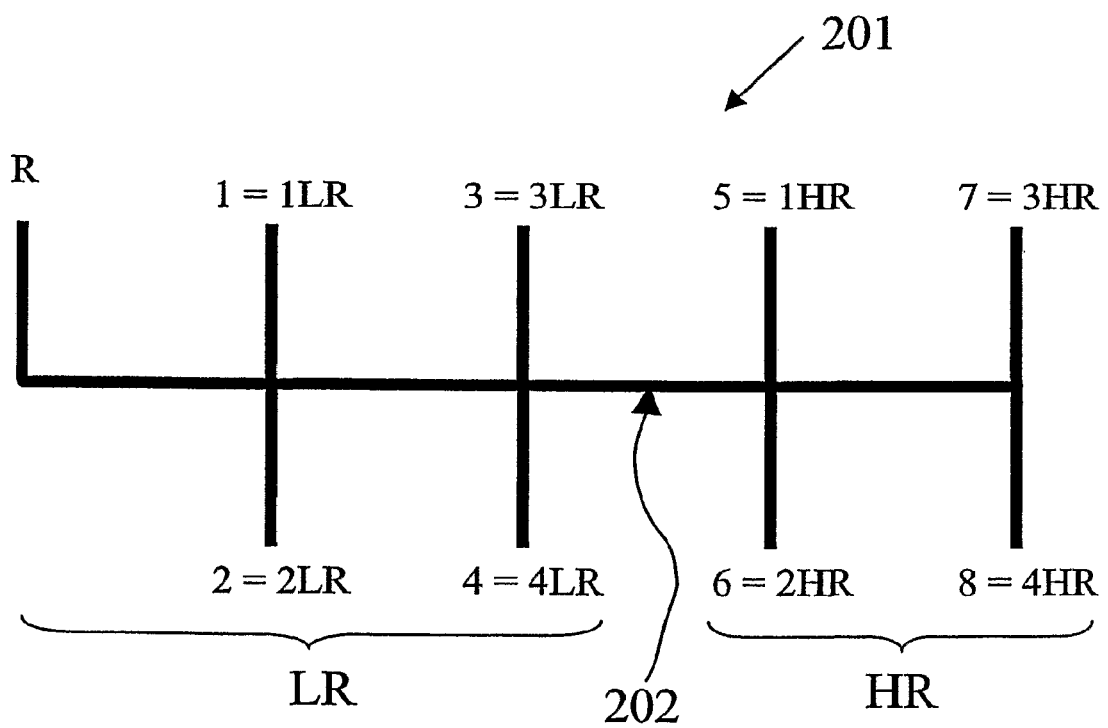
FIG. 2 shows a schematic representation of a gearshift pattern in the form of a double H-pattern according to the prior art.
Figure 3:
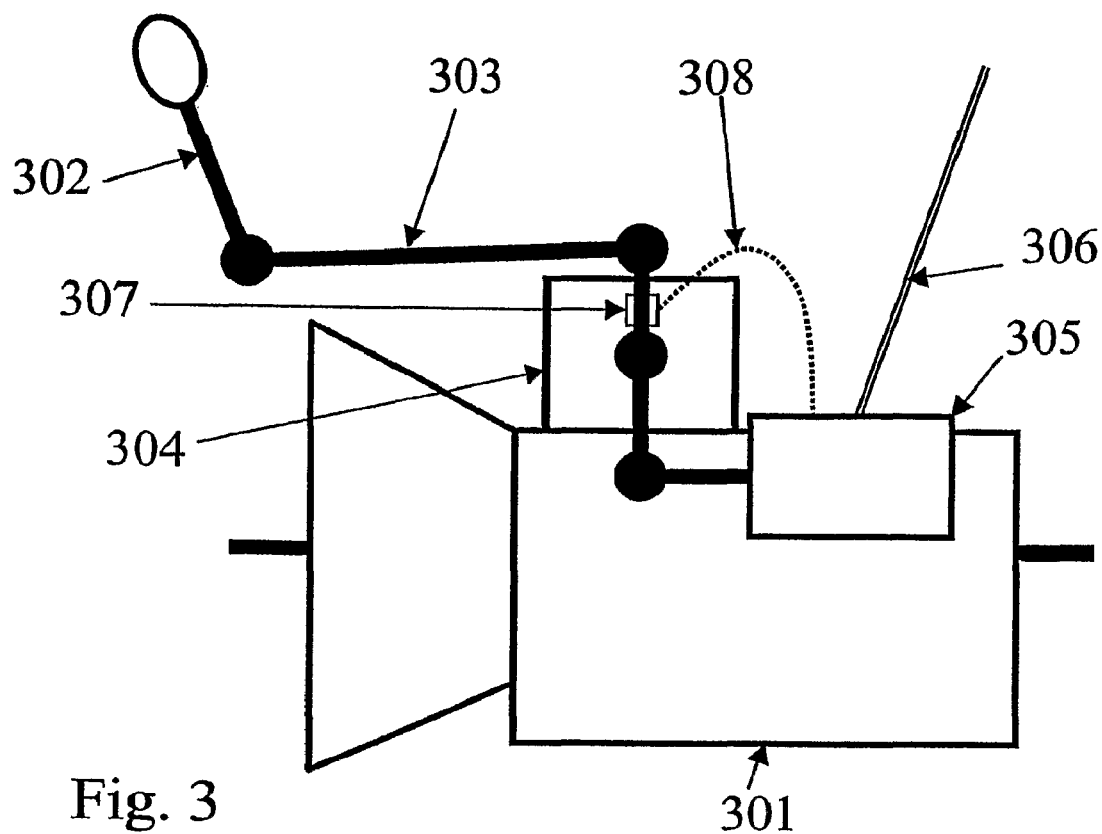
FIG. 3 shows a schematic representation of a transmission with shift servo according to the prior art.
Figure 4:
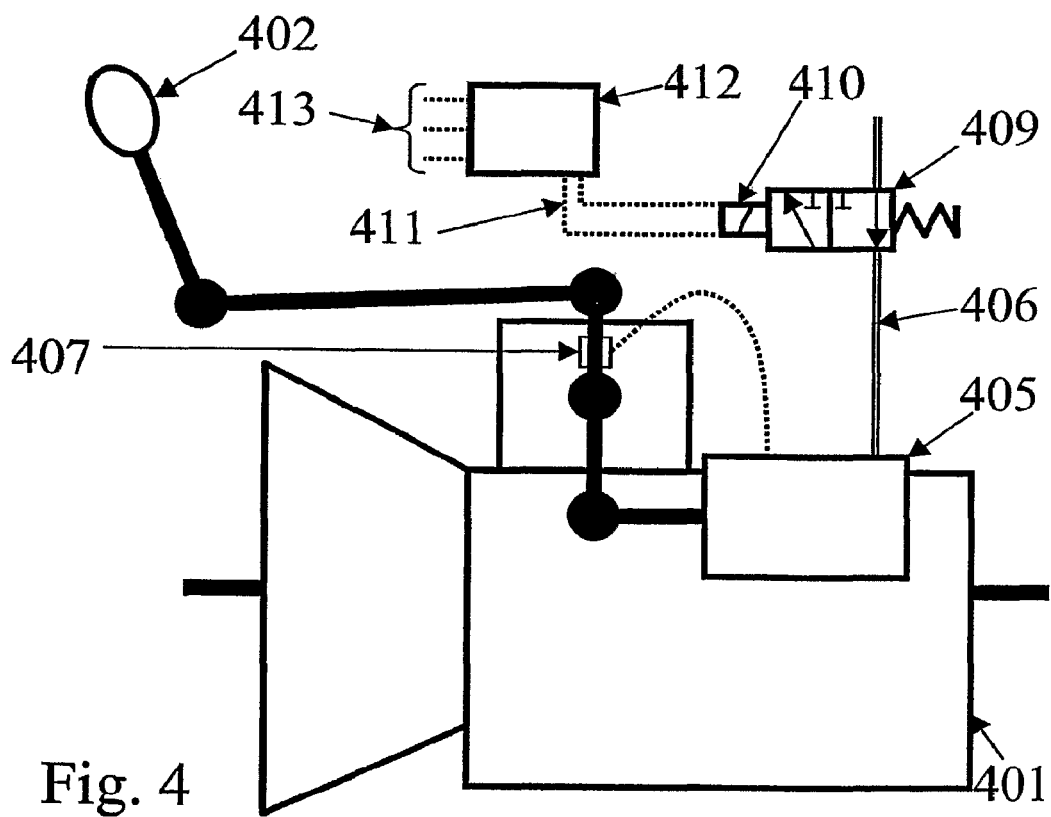
FIG. 4 shows a schematic representation of a transmission having a hydraulic or pneumatic shift servo with arrangement for reducing the servo action according to one embodiment of the invention.

Pneumatic and hydraulic shift servos, however, are generally not as easy to control. According to an advantageous embodiment of the invention the additional force supplied by the shift servo is reduced by restricting or interrupting the energy supply to the shift servo. This is represented schematically in FIG. 4 for an exemplary embodiment of an electronically controlled pneumatic or hydraulic shift servo. In normal working of the shift servo a solenoid valve 409 opens the supply of working medium (for example, compressed air or hydraulic oil) from an energy source (not shown) through a line 406 to the shift servo 405. Additional output force from a piston-cylinder arrangement (not shown) of the shift servo is controlled by a sensor arrangement 407 for detecting the shifting force applied to the gearshift control. If a voltage is applied to the coil 410 of the solenoid valve 409, the supply of working medium through the line 406 can be shut off. The shift servo 405 then delivers no additional force to the shifting force applied by the driver. The coil 410 of the solenoid valve 409 receives voltage, according to the preprogrammed control plan, via lines 411 from a control unit 412, which via a signal relay 413 receives information, for example, on the vehicle speed, the position of the gearshift control and whether or not the clutch pedal is depressed. The control unit 412 is preferably designed to receive information on at least two of said three parameters in order to achieve a satisfactory control function. From this information and information on inappropriate gearshifts in various vehicle conditions, preprogrammed into the control unit 412, the control unit controls the supply of working medium to the shift servo 405. In an alternative embodiment a continuous variation of the air pressure can be achieved if the solenoid valve 409 is controlled by pulse width modulation.

Figure 5:
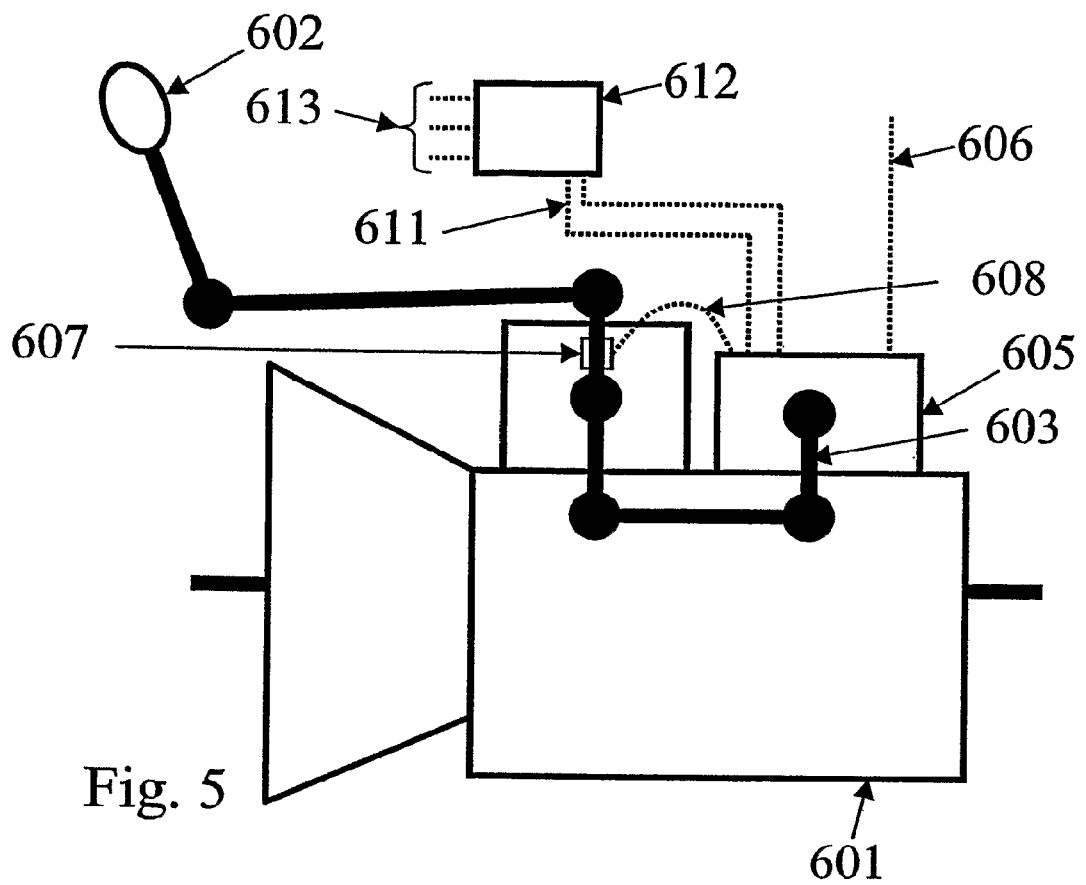
FIGS. 5 and 6 show a schematic representation of two different embodiments of the transmission arrangement according to the invention, having an electrical shift servo with arrangement for reducing the servo action.

FIG. 5 shows an exemplary embodiment of the invention having an electronically controlled electrical shift servo 605. In a corresponding way to that shown in the exemplary embodiment in FIG. 4, the control unit 612 can control the shift servo 605 through the signal relay 613 and lines 611. The solenoid valve 409,410 would then be replaced by a power electronic component (not shown), which controls the electrical voltage in an electrical energy supply lead 606. The shift servo can here consist of an electric motor (not shown), the output shaft of which is coupled to a connecting arrangement 603, extended by a further link arm, compared to the exemplary embodiment according to FIG. 4. With an electrical shift servo it is possible by a relatively simple control method to obtain a shifting force output from the shift servo which is opposed to the shifting force applied to the gearshift control. In the case of a d.c. motor this can be done by reversing the polarity of the electrical energy supplied to the shift servo. In principle the shifting force supplied by the shift servo can be set to any force level within a force range extending from just below the applied shifting force right down to a negative force level equal but opposed to the shifting force applied. A further increase in a shifting force opposed to the applied shifting force is not necessary, since the driver would otherwise perceive that the vehicle had taken command of the gearshift control.

Figure 6:
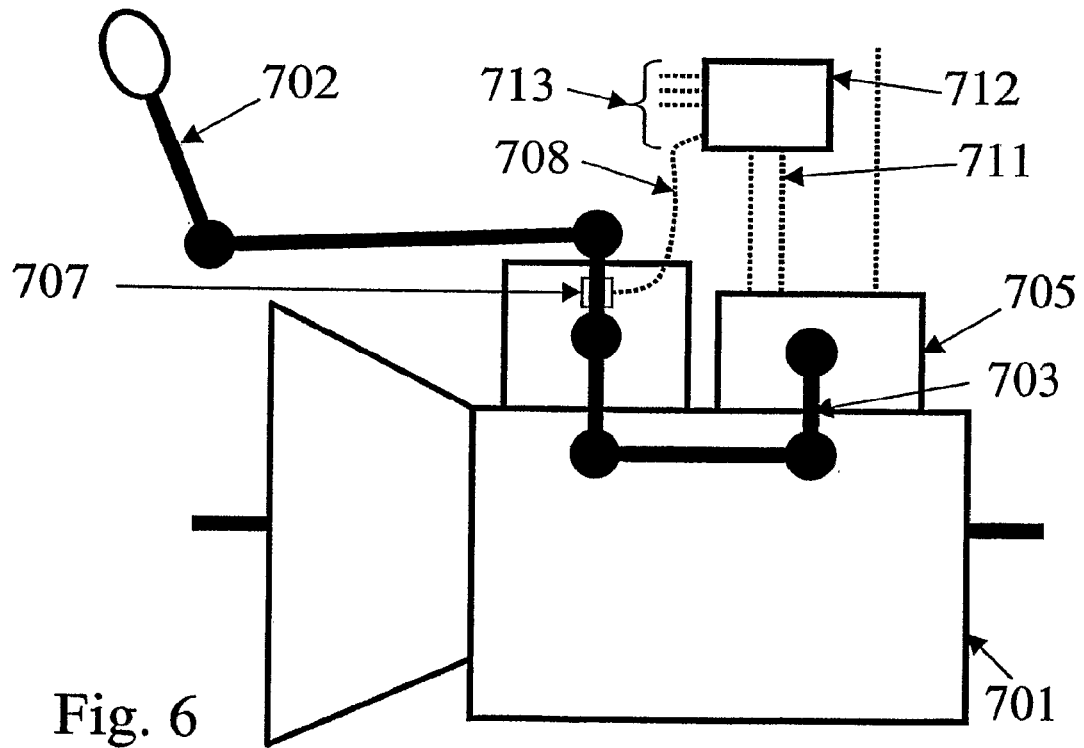

The embodiment according to FIG. 6 is identical to that shown in FIG. 5 except for one detail. In the embodiment according to FIG. 6, besides receiving information on the vehicle speed, the position of the gearshift control 702 and the position of the clutch pedal via signal relay 713, the control unit 712 also receives information on the magnitude of the force applied to the gearshift control 702. This information is obtained by the sensor arrangement 707 for detecting the shifting force applied to the gearshift control. Through this arrangement the control unit 712 can determine more accurately how much counteracting force the shift servo 705 must generate in order to counteract the shifting force applied to the gearshift control 702. Instead of just shutting off the energy supply to the shift servo 705, therefore, the control unit 712 can in addition or alternatively control the output force of the shift servo delivered to the connecting arrangement 703.

Figure 7:
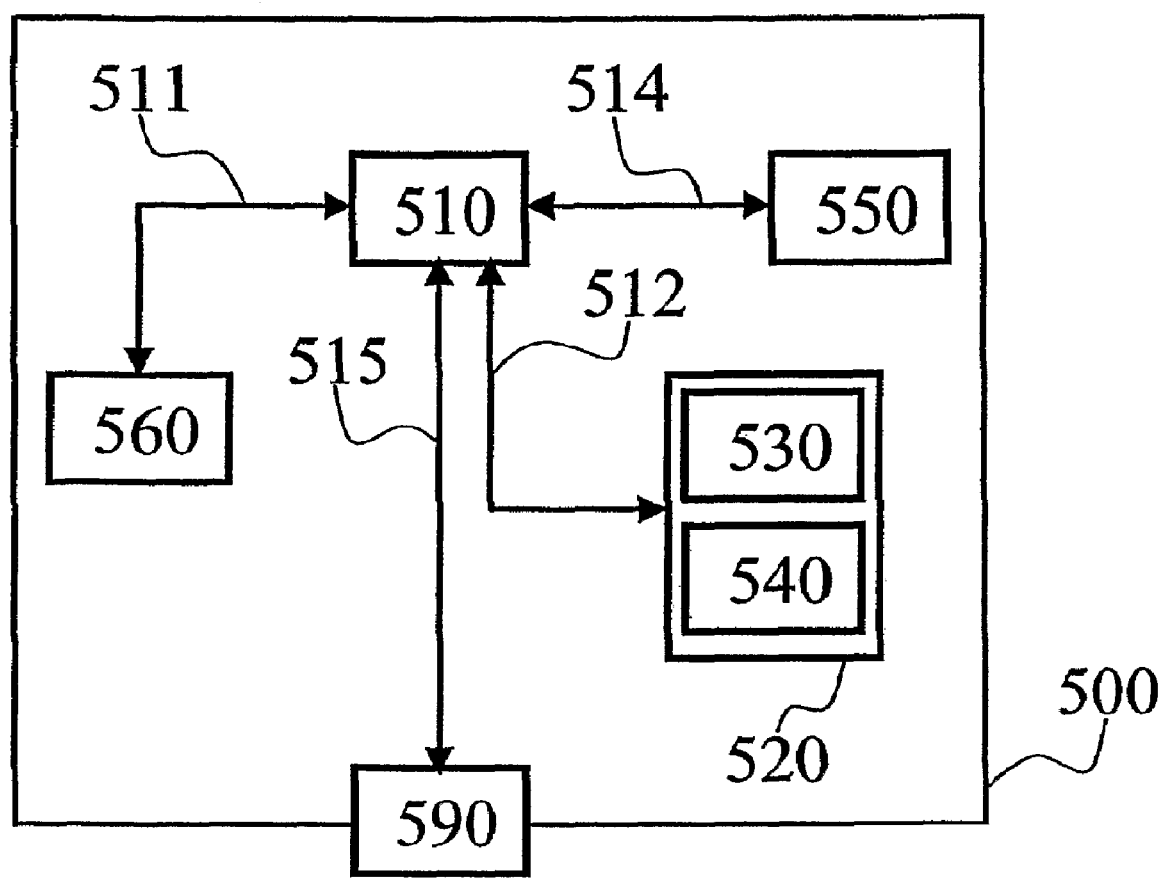
FIG. 7 shows an apparatus which is used according to at least one embodiment of the invention.

FIG. 7 shows an apparatus 500, according to one embodiment of the invention, comprising a non-volatile memory 520, a processor 510 and a read/write memory 560. The memory 520 has a first memory part 530, in which a computer program for controlling the apparatus 500 is stored. The computer program in the memory part 530 for controlling the apparatus 500 may be an operating system.

The apparatus 500 may be incorporated into a control unit, for example, such as the control unit 412, 612 or 712. The data-processing unit 510 may comprise a microcomputer, for example.

The memory 520 also has a second memory part 540, in which a program is stored for controlling the shift servo according to the invention. In an alternative embodiment the program for controlling the shift servo is stored on a separate, non-volatile data storage medium 550, such as a CD, for example, or a replaceable semiconductor memory. The program may be stored in an executable form or in a compressed state.

Where the data-processing unit 510 is described below as running a special function, it should be clearly understood that the data-processing 510 runs a special part of the program that is stored in the memory 540 or a special part of the program that is stored on the non-volatile recording medium 550.

The data processing unit 510 is adapted for communication with the memory 550 by means of a data bus 514. The data processing unit 510 is also adapted for communication with the memory 520 by means of a data bus 512. The data processing unit 510 is furthermore adapted for communication with the memory 560 by means of a data bus 511. The data processing unit 510 is also adapted for communication with a data port 590 by means of a data bus 515.

The method according to the present invention can be performed by the data processing unit 510 in that the data processing unit 510 runs the program, which is stored in the memory 540 or the program, which is stored on the non-volatile recording medium 550.

In an alternative embodiment of the invention the sensor arrangement 307,607, 707 or the signal relay 308,608, 708 can be activated so that the shift servo does not interpret any shifting force applied by the driver. The contact with the sensor arrangement could be interrupted by means of a switch arranged anywhere on the signal relay.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

The invention must not be regarded as being limited to the exemplary embodiments described above, a number of further variants and modifications being feasible without departing from the scope of the following claims. For example, the invention may be generally applied to a number of types of servos, for example a pneumatically controlled pneumatic servo, an electronically controlled hydraulic servo, mechanically controlled hydraulic servo etc.

What is claimed is:

1. A method for counteracting inappropriate manual gearshifts in predetermined vehicle conditions by way of a gearshift control, in a stage-geared transmission arranged in a motor vehicle and having a shift servo for intensifying the shifting force applied to the gearshift control, the method comprising:
   registering through the gearshift control an intention to shift to an inappropriate gear;
   at least reducing the shifting force supplied by the shift servo in order to counteract engagement of the inappropriate gear.

2. The method as claimed in claim 1, wherein the shifting force supplied by the shift servo is reduced in that the shift servo is set to a force level within a force range extending from just below the applied shifting force down to a negative force level equal but opposed to the shifting force applied.

3. The method as claimed in claim 1, wherein the shifting force supplied by the shift servo is reduced to zero.

4. The method as claimed in claim 3, wherein the shifting force supplied by the shift servo is reduced in that the shift servo is set to a force level within a force range extending from just below the applied shifting force down to a negative force level equal but opposed to the shifting force applied.

5. The method as claimed in claim 1, wherein the shifting force supplied by the shift servo is reduced by interrupting an energy supply to the shift servo.

6. The method as claimed in claim 1, wherein the shifting force applied to the gearshift control is measured, a level of output force from the shift servo being determined as a function of the measured shifting force applied.

7. The method as claimed in claim 6, wherein the shifting force supplied by the shift servo is reduced in that the shift servo is set to a force level within a force range extending from just below the applied shifting force down to a negative force level equal but opposed to the shifting force applied.

8. A stage-geared transmission for a motor vehicle, an input shaft of the transmission being coupled to an engine arranged in the vehicle for propelling the vehicle by way of a clutch for isolating the engine from the transmission, the transmission comprising:
   a gearshift control for manual gear selection;
   a sensor arrangement for detecting a shifting force applied to the gearshift control;
   a shift servo controlled by the sensor arrangement for amplifying the shifting force;
   a clutch control for controlling the clutch; and
   a control unit arranged to receive information on at least two of positions of the gearshift control, speed of vehicle, and position of the clutch control, the control unit being preprogrammed with information on inappropriate manual gear selection in various vehicle conditions, the control unit being designed to control the shift servo to at least reduce the shifting force of the shift servo and thereby counteract engagement of inappropriate gears.

9. The stage-geared transmission as claimed in claim 8, wherein the control unit is designed to reduce a shifting force supplied by the shift servo by setting the shift servo to a force level within a force range extending from just below the applied shifting force right down to a negative force level equal but opposed to the shifting force applied.

10. The stage-geared transmission as claimed in claim 9, wherein the control unit is arranged to reduce the shifting force of the shift servo by interrupting an energy supply to the shift servo.

11. The stage-geared transmission as claimed in claim 10, wherein the shift servo is pneumatic or hydraulic and the control unit is arranged to interrupt the energy supply by closing a valve arranged along an energy supply line.

12. The stage-geared transmission as claimed in claim 8, wherein the control unit receives information from the sensor arrangement on the shift force applied to control a level of output force of the shift servo as a function of a measured shifting force applied.

13. The stage-geared transmission as claimed in claim 12, wherein the control unit is designed to reduce a shifting force supplied by the shift servo by setting the shift servo to a force level within a force range extending from just below the applied shifting force right down to a negative force level equal but opposed to the shifting force applied.

14. A computer program comprising program code for performing the stages of the method in claim 1, when the computer program is executed on a computer.

15. A computer program product comprising program code stored on a computer-readable medium for performing the method in claim 1, when the computer program is executed on the computer.

16. A computer program product that can be loaded directly into an internal memory in a computer, comprising a computer program for performing the stages of the method in claim 1, when the computer program product is executed on the computer.

* * * * *